United States Patent [19]

Megahed et al.

[11] 3,880,672
[45] Apr. 29, 1975

[54] BATTERY BARRIER AND BATTERY
[75] Inventors: El Sayed Megahed; Randall W. Peters, both of Madison, Wis.
[73] Assignee: ESB Incorporated, Philadelphia, Pa.
[22] Filed: Mar. 23, 1973
[21] Appl. No.: 344,192

[52] U.S. Cl. .................................. 136/111; 136/102
[51] Int. Cl. ........................................... H01m 21/00
[58] Field of Search ............ 136/111, 102, 107, 146

[56] References Cited
UNITED STATES PATENTS

| | | | |
|---|---|---|---|
| 1,673,403 | 6/1928 | Dom | 136/111 |
| 2,859,266 | 11/1958 | Saivez et al. | 136/111 |
| 3,617,387 | 11/1971 | Grulkl | 136/111 |
| 3,711,336 | 1/1973 | Smotko | 136/146 |
| 3,754,998 | 8/1973 | Hamlen et al. | 136/102 |
| 3,761,315 | 9/1973 | Smatko | 136/146 |

Primary Examiner—John H. Mack
Assistant Examiner—C. F. Lefevour

[57] ABSTRACT

An electric battery having an organic barrier with an organic substrate, at least one side of which substrate has adhered thereto a mixture of a binder material and an inorganic material, in a dispersing medium.

16 Claims, 5 Drawing Figures

BATTERY BARRIER AND BATTERY

BACKGROUND OF THE INVENTION

1. Field of the Invention

This invention relates to an electric battery having an organic inter-electrode barrier with an organic substrate at least one side of which has adhered thereto a mixture of a binder material and an inorganic material in a dispersing medium. The battery of this invention will be particularly useful in alkaline battery systems where high rate capability maintenance and extended shelf life characteristics are desired.

2. Description of the Prior Art

High energy density electrochemical systems such as silver-zinc, mercury-zinc, nickel-cadmium, silver-cadmium, manganese-zinc, and mercury-cadmium are well known in the art and used in alkaline electrolyte cells where high energy density is required. Such high energy density batteries or cells are generally battery systems which have a substantially higher energy per unit of weight than conventional, e.g. lead storage batteries. Such high energy density batteries or cells can for example develop from 100–140 watt hours of energy per pound. These batteries or cells have numerous applications such as in portable tools and appliances, televisions, radios, hearing aids, and electric and electronic watches.

In batteries or cells of this type, the barrier employed performs the function of retaining electrolyte, e.g. potassium hydroxide, separating the electrodes, and deterring migration of electrode ions such as silver ions or growth of dendrite crystals of electrode ions such as zinc ions, which can short circuit the battery. The use of organic barriers in this capacity is well known in the art, however, such use is attended by certain problems. For example, such organic barriers may not be chemically stable, particularly at temperatures above 50°C; they may tend to swell excessively or otherwise degrade. Additionally, organics are not inert to oxidizing agents in caustic solutions; can be easily punctured by dendritic growth and may not effectively prevent ion migration which will result in self-discharging of the cell. The art is further complicated by the fact that barrier systems and other design parameters which result in a battery with high rate capability, typically are suboptimal for shelf life characteristics. That is, high rate capability alkaline batteries typically have poorer shelf life than low rate capability alkaline batteries, and conversely, long shelf life batteries typically do not have high rate capability. As a result of this trade-off, separator systems are sought which strive to optimally compromise the rate capability/shelf life characteristics of a given battery system.

A novel battery barrier has now been discovered which will greatly improve the shelf life characteristics of high rate battery systems, while at the same time maintaining the high rate capability. The barrier will also permit the redesign of low rate systems to achieve high rate capability while maintaining good shelf life characteristics.

SUMMARY OF THE INVENTION

The invention is directed to a battery comprising in combination:
a positive electrode,
a negative electrode,
an alkaline electrolyte in contact with said electrodes,
and an organic barrier between the electrodes.

The organic barrier of this invention comprises: an organic substrate at least one side of which has adhered there to a mixture consisting essentially of a binder material and an inorganic material in a dispersing medium.

DESCRIPTION OF THE INVENTION

Figure 1:
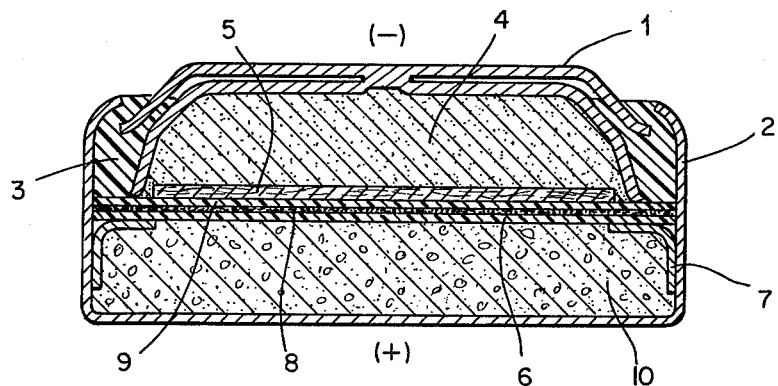
FIG. 1 is a cross-sectional view of a silver-zinc cell according to this invention.

A battery of this invention comprises a positive electrode, a negative electrode, an alkaline electrolyte in contact with said electrodes and pasted organic barrier between the electrodes.

The negative electrode or anode material of this invention may be selected from metals such as zinc, magnesium, aluminum or any other electronegative metal, including mixtures and alloys thereof. One skilled in the art can readily ascertain which anode material should be used depending on the particular application of the battery being produced. Zinc or zinc alloys are the generally preferred anode materials.

The positive electrode (cathode) material may comprise any suitable oxidizing agent, and may likewise be readily determined by one skilled in the art. Suitable cathode materials include $AgO$, $Ag_2O$, $HgO$, $MnO_2$, $NiOOH$ and the like.

Any suitable aqueous alkaline electrolyte solution may be used, and of course, the particular anode and cathode active materials and the battery application will determine the proper electrolyte. Sodium hydroxide and potassium hydroxide are preferred.

The pasted organic barrier of this invention comprises an organic substrate at least one side of which has adhered there to a mixture of a binder material and an inorganic material in a dispersing medium.

The organic substrate portion of the pasted barrier should permit the free passage of ions during discharge either through pores in the body of the organic substrate or via electrolyte absorbed within the organic area itself. At the same time the organic substrate material selected must slow ion migration and dendritic growth during periods of non-use or slow and/or intermittent use thus slowing the resultant self-discharging and extending shelf life. Among the materials having such properties there may be included cellulose, cellophane, polyvinyl alcohol, as well as similar polymers. Other polymers may be mentioned including the cellulose esters, the acetates, buterols, nitrates, partially hydrolized polyvinyl esters and modified polymers which are normally hydrophobic but which have been chemically altered to neutralize the hydrophobic characteristics by the introduction of hydrophilic groupings without altering the structure. Preferred organic substrate materials are Pudo cellophane (non-glycerine tested cellophane), Acropor (woven nylon base treated with polyvinyl chloride), Celgard (microporous polypropylene), Permion (polyethylene grafted with polyvinyl chloride), Viskon (regenerated cellulose treated with polyvinyl chloride), Pellon materials (polyester based), Dynel (acrylic copolymer) and the like. The most preferred is Pudo cellophane.

The dispersing medium utilized in the pasted organic barrier of this invention may be of any suitable composition so long as it is compatible with the cell system. It must serve to uniformly disperse both the binder material and the inorganic material of the pasted organic barrier and it should, when mixed with said binder material and inorganic material produce a pastelike mixture which is sticky, tacky and spreadable and which can be spread on and adhere to at least one surface of the organic substrate. Suitable dispersing media include alkaline electrolytes, water, and other solvents which do not inherently degrade the organic substrate or otherwise deter the satisfactory electrochemical functioning of the battery. Alkaline electrolytes are preferred due to their relatively good conductivity properties and most preferred is the use of the same electrolyte composition as is used in the battery proper, to assure compatibility. Potassium hydroxide and sodium hydroxide electrolytes are most preferred. Since commercial alkaline electrolytes often contain small amounts of other materials, e.g. a gas suppressant (ZnO) a small amount of such material also be present in the dispersing media, but they are not necessary to the invention or the beneficial results of the invention. The term alkaline electrolyte as used herein is therefore intended to include electrolytes having small amounts of such materials therein in addition to alkaline solutions without such additive materials. The concentration of an alkaline dispersing medium can be from about 18% hydroxide to saturation, but preferably is from about 30 to about 46% hydroxide.

The binder material of the mixture may be either organic or inorganic in nature so long as its addition to the dispersing medium provides the desired stickiness and cohesiveness which will enable the resultant mixture to be applied, e.g. spread upon and adhere to, the organic substrate; and so long as it is compatible with the battery system. The binder should be in powder form, i.e. rather than fibrous, to facilitate the application or spreading of the resultant mixture. Suitable binder materials include typical gelling, swelling, or suspending agents which have hydrophilic properties, including magnesium hydroxide, carboxy-methyl cellulose, guar gum, carbopol, and mixtures thereof and other suitable resins. Magnesium hydroxide or magnesium hydroxide in combination with Carbopol 941 are preferred.

The inorganic material of the mixture serves to preserve the organic substrate and subsequently the battery, from the mechanisms which typically cause shelf life deterioration, while at the same time allowing for the maintenance of high rate capability within the battery. It should be therefore selected to, and be present in amounts sufficient to, accomplish such preservation. Inorganic materials which are useful in the present invention include, for example, titanium dioxide, zirconium dioxide, aluminum sulfate, aluminum chloride, barium chloride, chromium chloride, and aluminum oxide. The most preferred inorganic material is titanium dioxide. As was true of the binder material, the inorganic material should be in powder form and compatible with the battery system.

The ingredients of the paste-like mixture which is adhered to the organic substrate may be mixed together by any art known process as can be readily determined by one skilled in the art, taking into consideration batch size and the application to which the battery is to be put. The paste-like mixture is then adhered to the organic substrate by any suitable means, e.g. spatula or piston pump, and the desired thickness is then obtained, e.g. by use of a doctor blade or the like. The pastelike mixture does not deeply impregnate the organic substrate not does it react with the organic substrate in such a way as to change its entity, structure or integrity.

In the battery and barrier of this invention, the surface density of the inorganic material in the barrier of the battery is from about 0.01 to about $7.00 \times 10^{-3}$ $g/cm^2$. By surface density as used herein is meant the amount, in grams, of inorganic material per $cm^2$ of active electrode surface area (i.e. surface area of electrode which can participate in the electrochemical activity of the battery cell. The preferred surface density is from about 0.10 to about $1.00 \times 10^{-3}$ $g/cm^2$. The optimum surface density will be readily determined once the thickness and end use of the barrier and battery are ascertained.

The weight ratio of binder material to inorganic material in the paste-like mixture of the barrier is from about 7:1 to about 40:1 and preferably from about 15:1 to about 25:1. However, these ratios depend on the type of substances used for the three components of the paste-like mixture and consequently should be optimized for each given formulation.

The materials useful as organic substrates in this invention are either readily available commercially or may be readily prepared by those skilled in the art through utilization of art known techniques. They may be employed in one layer (see FIGS. 2 and 3) or two or more layers (see FIGS. 1, 4 and 5).

Figure 2:
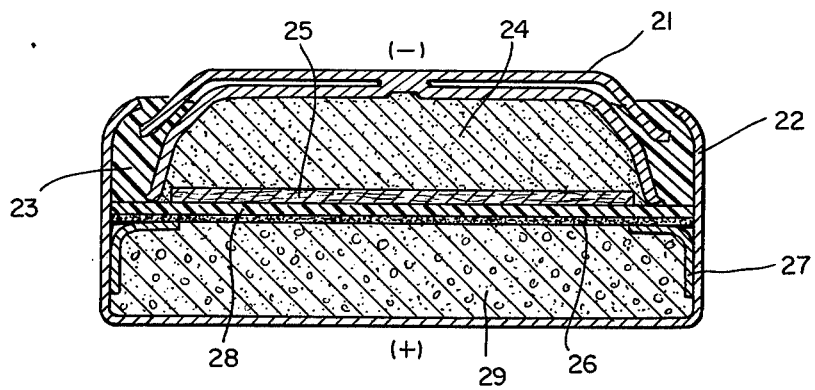
FIG. 2 is a cross-sectional view of another silver-zinc cell according to this invention.

In the event that a single layer organic substrate is employed, the paste-like mixture is preferably applied and adhered to e.g. spread on, the surface or side of the substrate in direct contact with the cathode material as in FIG. 2.

If a two layer organic substrate is employed, the paste may be adhered to the sides of each substrate layer facing each other, i.e. confronting sides, and the two substrate layers can be compressed together to form a "sandwich" with the mixture of paste between the two layers of the organic substrate as in FIG. 1. The paste may additionally be adhered to the side of the organic substrate layer which is in direct contact with the cathode material. When additional organic substrate layers are employed, the paste may be adhered in a similar manner, i.e. between organic substrate layers and if desired, also on the side of the organic substrate layer which is in direct contact with the cathode material.

While the thickness of the resultant pasted organic barrier does not necessarily determine ion migration, shelf life, or impedance, a thickness of from about 4 to about 15 mils is preferred for ease of handling and ease of preparation. Likewise, while the density and viscosity of the paste-like mixture is not controlling, the density is generally from about 1.2 to about 2.0 g/cc and preferably from about 1.4 to about 1.8 g/cc.

The pasted organic barrier can be cut to any desired size and configuration by any suitable means known in the art and then assembled into the desired battery between the positive and negative electrodes.

Referring now to FIG. 1, this Figure is a cross-sectional view of a primary silver-zinc cell according to one embodiment of this invention. The cell has a two part container comprising an upper section or cap 1 which houses the negative electrode or anode, and a lower section or cup 2 which houses the positive electrode or cathode. The bottom cup 2 may be made of any suitable material such as nickel plated steel and the cap 1 may likewise be made of any suitable material such as tin plated steel. Cap 1 is insulated from the cup 2 by means of an insulating and sealing collar 3 which may be made of any suitable resilient electrolyte-resistant material such as high-density polyethylene or neoprene or nylon and it may be integrally molded around the edges of the cap 1 for insulating the cap from the cup 2 and also to constitute a liquid tight enclosure therewith.

The negative electrode 4 of the cell comprises a gelled, semi-gelled, powdered or press powdered zinc. The zinc electrode 4 is separated from the positive electrode by means of an electrolyte-absorbent layer 5 and a pasted organic barrier 6. This pasted organic barrier 6 is in accorodance with the present invention, and consists of a two layer organic substrate, i.e. layers 6 and 9, having sandwiched therebetween a paste-like mixture 8 in accordance with the present invention. The layers of the organic substrates 6 and 9 may be of any suitable material as set forth in the specification, e.g. cellophane, and the paste-like mixture may be for example, a mixture of magnesium hydroxide and titanium dioxide in a solution of potassium hydroxide. The positive electrode 10 of this cell is silver oxide. Mix sleeve 7 of the cell may be made of any suitable material such as nickel plated steel.

FIG. 2 is a cross-sectional view of another primary silver-zinc cell according to one embodiment of this invention. In this Figure, items 21–25 correspond both in function and in material of construction to items 1–5 of FIG. 1. The pasted organic barrier of this embodiment employs a single layer organic substrate 28 of a suitable material such as cellophane having adhered to one side thereof, i.e. this side in direct contact with the cathode material, a paste-like mixture 26 which is of any suitable material as defined herein, e.g. magnesium hydroxide and titanium dioxide mixed in a solution of potassium hydroxide. Positive electrode 29 and mix sleeve 27 are defined with respect to FIG. 1 above.

Figure 3:
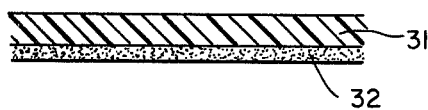
FIG. 3 is a cross-sectional view of a battery barrier according to this invention.

FIG. 3 is a somewhat enlarged cross-sectional view of a battery barrier according to one embodiment of this invention such as the one found in FIG. 2. This is a pasted organic barrier comprising a single layer organic substrate 31 having adhered to one side thereof a paste-like mixture of a binder material and inorganic material in a suitable dispersing medium.

Figure 4:
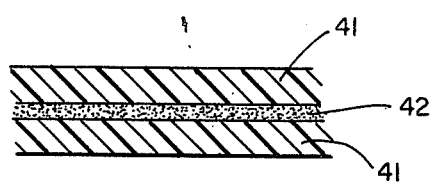
FIG. 4 is a cross-sectional view of another battery barrier according to this invention.

FIG. 4 is a somewhat enlarged cross-sectional view of a pasted organic barrier according to this invention such as the one found in FIG. 1. This pasted organic barrier comprises a two layer organic substrate 41 having "sandwiched" therebetween a paste-like mixture of a binder material and inorganic material in a suitable dispersing medium.

Figure 5:
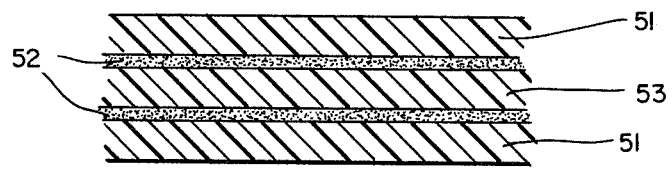
FIG. 5 is a cross-sectional view of still another battery barrier according to this invention.

FIG. 5 is a somewhat enlarged sectional view of a multi-layered barrier in accordance with the present invention. 51 and 53 represent three layers of an organic substrate which may be of any suitable material. All three layers of the organic substrate may be made of the same material or they can be varied. For example, layers 51 of the organic substrate may be of cellophane while layer 53, for example, may be of some other suitable material such as Acropor. In this Figure, 52 represents a pastelike mixture of binder material and inorganic material in a suitable dispersing medium which is adhered to and sandwiched between the sides of the organic substrate facing each other.

EXAMPLES

The following examples are intended to be merely illustrative of the invention and not in limitation thereof. Unless otherwise indicated, all quantities are by weight.

GENERAL EXPLANATION

Data representing examples of batteries employing the barrier and battery of this invention are presented in table form. For each example the pertinent control and variation(s) are as similar in all battery component and procedure parameters as normal production techniques allow except that the "variations" represent batteries of this invention utilizing the barrier of this invention, while "controls" do not employ the barrier of this invention nor do they represent batteries of this invention. The result is that direct data comparisons are possible. A general description of the headings used follows:

Organic Substrates

The type and number of organic substrates used in the batteries is given both for controls and variations.

Paste Composition

The paste-like mixture is broken down into its components and their mixture ratio:
1 Dispersing Media
2 Binder Material
3 Inorganic Material
Mixture Ratio (1):(2):(3) - based on 100%

Surface Density (g/cm$^2$ × 10$^{-3}$)

Numbers here refer to grams of inorganic material 3 per cm$^2$ of active electrode surface area. The quantity is calculated based on the paste-like mixture density, the mixture ratio, and the pasted barrier thickness. This valve and the type of inorganic material utilized are the primary factors responsible for generating the benefits manifested by this invention. Variations in dispersing media, binder and mixture ratio are more oriented toward ease of handling and production feasibility.

The last column(s) for any given example pertain to testing criteria and detailed descriptions of the test criteria as well as battery type, size, and system used for each example are provided with each pertinent example table.

EXAMPLE - 1

Battery Size - 41G (.455" dia.)  
Battery System - $Ag_2O$—Zn  
Battery Electrolyte - KOH  
Battery Application - High Rate Hearing Aid

| Denotation | Organic Substrate | (1) Dispersing Media | (2) Binder | (3) Inorganic Material | Mixture Ratio (1):(2):(3) | Surface Density (g/cm² × $10^{-3}$) | Rate Capability Criteria | Shelf Life Criteria % Rejects | Shelf Life Criteria % Cap. Ret. |
|---|---|---|---|---|---|---|---|---|---|
| Control 1 | one layer Pudo | None | None | None | — | 0.0 | 1.502 | 93.0 | <10.0 |
| Variation 1 | one layer Pudo | 46% KOH + 7% ZnO | $Mg(OH)_2$ | $TiO_2$ | 46.7:46.7:6.6 | 0.32 – 1.20 | 1.480 | 0.0 | 80.0 |

Test criteria were established as follows:

(1) Rate Capability — Values shown represent average discharge voltage levels on a 625 ohm load, a standard hearing aid test, three cells/test. The higher this voltage level, the higher the rate capability of the battery.

(2) % Rejects — Values shown represent the number of cells with an open circuit voltage of less than 1.55V after 8 weeks of storage at 130°F – 50% RH, divided by the total number tested, times 100. The lower this value, the better the shelf life of the battery.

(3) % Capacity Retention — Values shown represent the average capacity obtained on a 625 ohm load after 8 weeks of storage at 130°F – 50% RH divided by the capacity obtained on this load initially, times 100. Initial capacities were similar for control and variation. Three cells/test. The higher this value, the better the shelf life of the battery.

This example shows a single layer organic substrate in a high rate $Ag_2$-Zn system using KOH for the battery electrolyte. It can be seen from the data that use of the barrier of this invention significantly improves battery shelf life while at the same time maintaining high rate capability.

EXAMPLE - 2

Battery Size - 41G (.455" dia.)  
Battery System - $Ag_2O$—Zn  
Battery Electrolyte - KOH  
Battery Application - Low Rate Hearing Aid

| Denotation | Organic Substrate | (1) Dispersing Media | (2) Binder | (3) Inorganic Material | Mixture Ratio (1):(2):(3) | Surface Density (g/cm² × $10^{-3}$) | Rate Capability Criteria | Shelf Life Criteria % Rejects | Shelf Life Criteria % Cap. Ret. |
|---|---|---|---|---|---|---|---|---|---|
| Control 2 | two layers Pudo | None | None | None | — | 0.0 | 1.409 | 10.0 | 70.0 |
| Variation 2 | two layers Pudo | 46% KOH + 7% ZnO | $Mg(OH)_2$ | $TiO_2$ | 46.7:46.7:6.6 | 2.1 – 4.2 | 1.480 | 9.0 | 95.0 |

Test criteria were established as follows:

(1) Rate Capability — Same as for Example 1.

(2) % Rejects — Same as for Example 1, except storage time is given by high temperature testing which projected to 2 years, 3 months at room temperature, 70°F.

(3) % Capacity Retention — Same as for Example 1, except pre-test storage time is given by high temperature testing which projected to 2 years, 3 months at room temperature, 70°F.

This example shows the preferred two layer organic substrate in a low rate $Ag_2O$—Zn system using KOH for the battery electrolyte. It can be seen from the data that use of the barrier of the invention significantly increases rate capability while at the same time maintaining battery shelf life. (Here the 1.409V level for control 2 indicates low rate capability, while as in Ex. 1, the 1.480V level for variation 2 indicates high rate capability.)

EXAMPLE - 3

Battery Size - 41G (.455" dia.)  
Battery System - $Ag_2O$—Zn  
Battery Electrolyte - KOH  
Battery Application - High Rate Hearing Aid

| Denotation | Organic Substrate | (1) Dispersing Media | (2) Binder | (3) Inorganic Material | Mixture Ratio (1):(2):(3) | Surface Density (g/cm² × $10^{-3}$) | Rate Capability Criteria | Shelf Life Criteria % Rejects | Shelf Life Criteria % Cap. Ret. |
|---|---|---|---|---|---|---|---|---|---|
| Control 3 | two layers Pudo | None | None | None | — | 0.0 | 1.463 | 90.0 | 00.0 |
| Variation 3 | two layers Pudo | 30% KOH | $Mg(OH)_2$ | $TiO_2$ | 60.9:38.1:1.0 | 0.36 – 0.47 | 1.480 | 00.0 | 91.9 |
| Variation 4 | two layers Pudo | 30% KOH | $Mg(OH)_2$ | $TiO_2$ | 63.2:35.0:1.8 | 0.26 – 0.51 | 1.480 | 00.0 | 87.0 |
| Variation 5 | two layers Pudo | 46% KOH + 7% ZnO | $Mg(OH)_2$ | $TiO_2$ | 63.6:35.4:1.0 | 0.13 – 0.26 | 1.470 | 00.0 | 88.0 |
| Variation 6 | two layers Pudo | 46% KOH + 7% ZnO | $Mg(OH)_2$ | $TiO_2$ | 60.3:37.7:2.0 | 0.36 – 0.71 | 1.469 | 00.0 | 94.5 |

Test criteria were established as follows:

(1) Rate Capability — Same as for Example 1.

(2) % Rejects — Same as for Example 1, except storage time was 16 weeks at 130°F – 50% RH (3) % Capacity Retention — Same as for Example 1, except pre-test storage time was 16 weeks at 130°F – 50% RH This example shows the preferred two layer organic substrate in a high rate $Ag_2O$—Zn system using KOH for the battery electrolyte. In concept it is a rerun of Example 1, but discharge tests were run in duplicate and shelf life tests used 12–16 cells/test and also were run in duplicate. The variations 3–6 cover two dispersing media, several mixture ratios, and a range of surface densities and shows clearly that any of the variations 3–6 (present invention) maintain high rate capability while significantly improving shelf life.

EXAMPLE - 4

Battery Size - 41G (.455" dia.)  
Battery System - Ag$_2$O—Zn  
Battery Electrolyte - KOH  
Battery Application - Low Rate Hearing Aid

| Denotation | Organic Substrate | Paste Composition (1) Dispersing Media | (2) Binder | (3) Inorganic Material | Mixture Ratio (1):(2):(3) | Surface Density (g/cm$^2$ × 10$^{-3}$) | Rate Capability Criteria | % Rejects | Shelf Life Criteria % Cap. Ret. |
|---|---|---|---|---|---|---|---|---|---|
| Control 4 | two layers Pudo | None | None | None | — | 0.0 | 1.414 | 14.3 | 67.3 |
| Variation 7 | two layers Pudo | 30% KOH | Mg(OH)$_2$ | TiO$_2$ | 60.9:38.1:1.0 | 0.32 – 0.54 | 1.436 | 00.0 | 79.4 |
| Variation 8 | two layers Pudo | 30% KOH | Mg(OH)$_2$ | TiO$_2$ | 63.2:35.0:1.8 | 0.19 – 0.52 | 1.440 | 00.0 | 76.7 |
| Variation 9 | two layers Pudo | 46% KOH + 7% ZnO | Mg(OH)$_2$ | TiO$_2$ | 63.6:35.4:1.0 | 0.13 – 0.45 | 1.430 | 00.0 | 86.1 |
| Variation 10 | two layers Pudo | 46% KOH + 7% ZnO | Mg(OH)$_2$ | TiO$_2$ | 60.3:37.7:2:0 | 0.27 – 1.06 | 1.431 | 00.0 | 80.3 |

Test criteria were established as follows:
(1) Rate Capability — Same as for Example 1.
(2) % Rejects — Same as for Example 1, except storage time was 22 weeks at 130°F – 50% RH.
(3) % Capacity Retention — Same as for Example 1, except pre-test storage time was 22 weeks at 130°F – 50% RH.
This example shows the preferred two layer organic substrate in a low rate Ag$_2$O—Zn system using KOH for the battery electrolyte. In concept it is a rerun of Example 2, but discharge tests were run in duplicate and shelf life tests used 12–16 cells/test and also were run in duplicate. The variations 7–10 cover two dispersing media, several mixture ratios, and a range of surface densities of the present invention and shows clearly that any of the variations 7–10 (present invention) maintain or improve shelf life, while improving rate capability.

EXAMPLE - 5

Battery Size - RW-11 (.605" dia.)  
Battery System - Ag$_2$O—Zn  
Battery Electrolyte - KOH  
Battery Application - High Rate Watch

| Denotation | Organic Substrate(s) | Paste Composition (1) Dispersing Media | (2) Binder | (3) Inorganic Material | Mixture Ratio (1):(2):(3) | Surface Density (g/cm$^2$ × 10$^{-3}$) | Rate Capability Criteria | Shelf Life Criteria % Rejects |
|---|---|---|---|---|---|---|---|---|
| Control 5 | two layers Pudo | None | None | None | — | 0.0 | 1.0 – 1.5 | 45.0 |
| Variation 11 | two layers Pudo | 46% KOH + 7% ZnO | Mg(OH)$_2$ | TiO$_2$ | 60.3:37.7:2.0 | 0.50 – 0.71 | 0.8 – 1.5 | 00.0 |

Test criteria were established as follows:
(1) Rate Capability — Values shown represent flash amperage, in amps, readings taken initially on the batteries. Range represents 60 – 100 batteries. The higher this value the higher the rate capability.
(2) % Rejects — Same as for Example 1, except storage time was 12 weeks at 130°F – 50% RH.
This example shows the preferred two layer organic substrate in a high rate Ag$_2$O—Zn system using KOH for the battery electrolyte, but with the battery size and application being different from Examples 1–4. It can be seen from the data that high rate capability is maintained while shelf life is significantly improved using barrier and battery of the present invention.

EXAMPLE - 6

Battery Size - RW-12 (.455"dia.)  
Battery System - Ag$_2$O—Zn  
Battery Electrolyte - NaOH  
Battery Application - Low Rate Watch

| Denotation | Organic Substrate(s) | Paste Composition (1) Dispersing Media | (2) Binder | (3) Inorganic Material | Mixture Ratio (1):(2):(3) | Surface Density (g/cm$^2$ × 10$^{-3}$) | Rate Capability Criteria | Shelf Life Criteria % Rejects |
|---|---|---|---|---|---|---|---|---|
| Control 6 | two layers Pudo/ one layer Viskon | None | None | None | — | 0.0 | 0.14 | 00.0 |
| Variation 12 | two layers Pudo only | 46% KOH + 7% ZnO | Mg(OH)$_2$ | TiO$_2$ | 60.3:37.7:2.0 | 0.36 | 0.42 | 00.0 |

Test criteria were established as follows:
(1) Rate Capability — Values shown represent average flash amperage, in amps, readings taken initially on the batteries, six cells/average. The higher this value, the higher the rate capability.
(2) % Rejects — Same as for Example 1, except storage conditions were 12 weeks at 130°F – 50% RH. Six cells/test.
This example shows that the preferred two layer organic substrate in a low rate Ag$_2$O—Zn system using NaOH as the battery electrolyte has equivalent shelf life but improved rate capability over a control which has three organic layers, (i.e., an additional Viskon layer).

EXAMPLE - 7

Battery Size - 675RP (.455" dia.)  
Battery System - HgO—Zn  
Battery Electrolyte - KOH  
Battery Application - Hearing Aid

| Denotation | Organic Substrate | Paste Composition (1) Dispersing Media | (2) Binder | (3) Inorganic Material | Mixture Ratio (1):(2):(3) | Surface Density (g/cm$^2$ × 10$^{-3}$) | Rate Capability Criteria | % Rejects | Shelf Life Criteria % Cap. Ret. |
|---|---|---|---|---|---|---|---|---|---|
| Control 7 | two layers Pudo | None | None | None | — | 0.0 | .012 | 82.6 | 91.3 |

EXAMPLE - 7 —Continued

Battery Size - 675RP (.455" dia.)  
Battery System - HgO—Zn  
Battery Electrolyte - KOH  
Battery Application - Hearing Aid

| Denotation | Organic Substrate | (1) Dispersing Media | (2) Binder | (3) Inorganic Material | Mixture Ratio (1):(2):(3) | Surface Density (g/cm² × 10⁻³) | Rate Capability Criteria | % Rejects | Shelf Life Criteria % Cap. Ret. |
|---|---|---|---|---|---|---|---|---|---|
| Variation 12 | two layers Pudo | 46% KOH + 7% ZnO | Mg(OH)₂ | TiO₂ | 60.3:37.7:2.0 | 0.36 – 0.71 | .017 | 26.1 | 96.6 |

Test Criteria were established as follows:
(1) Rate capability — Values shown represent the amp-hours obtained to a 1.20 volt endpoint on an initial discharge load of 300 ohms. The higher this value, the higher the rate capability. Three cells/test.
(2) % Rejects — Values shown represent the number of cells with an open circuit voltage of less than 1.40V after 12 weeks of storage at 113°F – 50% RH, divided by the total number tested, times 100. The lower this value, the better the shelf life of the battery. Twenty-three cells/test.
(3) % Capacity Retention — Values shown represent the average capacity obtained on a 300 ohm load after 12 weeks of storage at 113°F – 50% RH, divided by the capacity obtained on this load initially, times 100. Initial capacities were similar for control and variation. Three cells/test. The higher this value, the better the shelf life of the battery.
This example shows the preferred two layer organic substrate in a HgO—Zn system using KOH for the battery electrolyte. From the data it can be seen that in systems other than those of the previous examples e.g. HgO—Zn, high rate capability can be maintained or improved while shelf life is improved utilizing the barrier and battery of the present invention.

EXAMPLE - 8

Battery Size - 41G (.455" dia.)  
Battery System - Ag₂O—Zn  
Battery Electrolyte - KOH  
Battery Application - High Rate Hearing Aid

| Denotation | Organic Substrate | (1) Dispersing Media | (2) Binder | (3) Inorganic Material | Mixture Ratio (1):(2):(3) | Surface Density (g/cm² × 10⁻³) | Rate Capability Criteria | % Rejects | Shelf Life Criteria % Cap. Ret. |
|---|---|---|---|---|---|---|---|---|---|
| Control 8 | two layers Pudo | None | None | None | — | 0.0 | .096 | 43.8 | 66.6 |
| Control 9 | two layers Celgard 2400W | None | None | None | — | 0.0 | .000 | 100.0 | 00.0 |
| Variation 14 | two layers Celgard 2400W | 46% KOH + 7% ZnO | Mg(OH)₂ | TiO₂ | 65.5:32.8:1.7 | 0.44 – 0.52 | .017 | 11.8 | 69.5 |
| Variation 15 | one layer Pudo/ one layer Acropor | 46% KOH + 7% ZnO | Mg(OH)₂+ Carbopol 941 | TiO₂ | 70.9:27.7:1.4 | 0.44 – 0.74 | .098 | 0.0 | 77.0 |

Test criteria were established as follows:
(1) Rate Capability — Values shown represent the amp-hours obtained to a 1.45 volt endpoint on an initial discharge load of 625 ohms. The higher this value, the higher the rate capability. Three cells/test.
(2) % Rejects — Same as for Example 1, except storage time was 6 weeks at 130°F – 50% RH.
(3) % Capacity Retention — Same as for Example 1, except pre-test storage time was 10 weeks at 180°F – 50% RH.
Several points are illustrated by this example:
(1) Variation 15 shows that different organic substrates within the scope of this invention can be combined to generate the effect of high rate capability maintenance while improving shelf life.
(2) Variation 15 compared to Control 9 shows a significant improvement in both high rate capability and shelf life with the preferred two layer organic substrate being different from Pudo.
(3) Variation 15 also successfully employed a modified binder.

EXAMPLE - 9

Battery Size - 41G (.455" dia.)  
Battery System - Ag₂C—Zn  
Battery Electrolyte - KOH  
Battery Application - High Rate Hearing Aid

| Denotation | Organic Substrate | (1) Dispersing Media | (2) Binder | (3) Inorganic Material | Mixture Ratio (1):(2):(3) | Surface Density (g/cm² × 10⁻³) | Rate Capability Criteria | % Rejects | Shelf Life Criteria % Cap. Ret. |
|---|---|---|---|---|---|---|---|---|---|
| Control 8 | two layers Pudo | None | None | None | — | 0.0 | .096 | 43.8 | 0.0 |
| Variation 16 | two layers Pudo | 46% KOH + 7% ZnO | Mg(OH)₂+ Carbopol 941 | TiO₂ | 70.9:27.7:1.4 | 0.19 – 0.25 | .098 | 5.9 | 63.6 |

Test criteria were established as follows:
(1) Rate Capability — Same as for Example 8.
(2) % Rejects — Same as for Example 8.
(3) % Capacity Retention — Same as for Example 8, except pre-test storage conditions were 8 weeks at 145°F – 50% RH.
This example shows that a preferred embodiment of this invention with a modified binder composition within the scope of this invention can also generate the benefit of high rate capability maintenance while improving shelf life.

EXAMPLE - 10

Battery Size - 41G (.455″ dia.)  
Battery System - Ag$_2$O—Zn  
Battery Electrolyte - KOH  
Battery Application - High Rate Hearing Aid

| Denotation | Organic Substrate(s) | Paste Composition (1) Dispersing Media | (2) Binder | (3) Inorganic Material | Mixture Ratio (1):(2):(3) | Surface Density (g/cm$^2$ × 10$^{-3}$) | Rate Capability Criteria | Shelf Life Criteria % Rejects |
|---|---|---|---|---|---|---|---|---|
| Control 8 | two layers Pudo | None | None | None | — | 0.0 | .096 | 43.8 |
| Variation 17 | two layers Pudo | 46% KOH + 7% ZnO | Mg(OH)$_2$ | TiO$_2$ | 65.5:32.8:1.7 | 0.22 – 0.30 | .098 | 00.0 |
| Variation 18 | two layers Pudo | 46% KOH + 7% ZnO | Mg(OH)$_2$ | ZrO$_2$ | 65.5:32.8:1.7 | 0.22 – 0.30 | .095 | 23.6 |
| Variation 19 | two layers Pudo | 46% KOH + 7% ZnO | Mg(OH)$_2$ | Al$_2$(SO$_4$)$_3$ | 65.5:32.8:1.7 | 0.22 – 0.30 | .098 | 29.4 |
| Variation 20 | two layers Pudo | 46% KOH + 7% ZnO | Mg(OH)$_2$ | AlCl$_3$ | 65.5:32.8:1.7 | 0.22 – 0.30 | .100 | 41.2 |
| Variation 21 | two layers Pudo | 46% KOH + 7% ZnO | Mg(OH)$_2$ | BaCl$_2$ | 65.5:32.8:1.7 | 0.22 – 0.37 | .099 | 23.6 |
| Variation 22 | two layers Pudo | 46% KOH + 7% ZnO | Mg(OH)$_2$ | CrCl$_3$ | 65.5:32.8:1.7 | 0.22 – 0.37 | .100 | 00.0 |

Test criteria were established as follows:
(1) Rate Capability — Same as for Example 8.
(2) % Rejects — Same as for Example 8.
This example shows the preferred two layer organic substrate used with a variety of inorganic additives useful in this invention any of which generate some degree of benefit according to the previously asserted high rate capability maintenance while improving shelf life.

EXAMPLE - 11

Battery Size - 41G (.455″ dia.)  
Battery System - Ag$_2$O—Zn  
Battery Electrolyte - KOH  
Battery Application - High Rate Hearing Aid

| Denotation | Organic Substrate(s) | Paste Composition (1) Dispersing Media | (2) Binder | (3) Inorganic Material | Mixture Ratio (1):(2):(3) | Surface Density (g/cm$^2$ – 10$^{-3}$) | Rate Capability Criteria | Shelf Life Criteria % Rejects |
|---|---|---|---|---|---|---|---|---|
| Control 8 | two layers Pudo | None | None | None | — | 0.0 | .096 | 81.5 |
| Variation 23 | two layers Pudo | 46% KOH + 7% ZnO | Mg(OH)$_2$ | Al$_2$O$_3$ | 65.5:32.8:1.7 | 0.22 – 0.30 | .091 | 68.8 |

Test criteria were established as follows:
(1) Rate Capability — Same as Example 8.
(2) % Rejects — Same as Example 8, except storage conditions were 6 weeks at 145°F – 50% RH.
This example shows another inorganic additive useful in this invention along the lines of those shown in Example 10.

The embodiment of the invention in which an exclusive property or privilege is claimed are defined as follow:

1. An electric battery comprising in combination
   a. a positive electrode,
   b. a negative electrode,
   c. an alkaline electrolyte in contact with said electrodes, and
   d. an organic barrier between said electrodes which barrier comprises an organic substrate at least one side of which has adhered thereto a paste-like mixture consisting essentially of a binder material and an inorganic material in a dispersing medium wherein the surface density of the inorganic material in the mixture of (d) is from about 0.01 to about 7.00 × 10$^{-3}$ g/cm$^2$ of active electrode surface area and wherein the inorganic material of (d) is selected from the group consisting of titanium dioxide, zirconium dioxide, aluminum sulfate, aluminum chloride, aluminum oxide, barium chloride and chromium chloride.

2. A battery according to claim 1 wherein the organic substrate of (d) consists essentially of a material selected from the group consisting of cellulose, cellophane, acetates, butyrols, nitrates and partially hydrolyzed polyvinyl esters.

3. A battery according to claim 1 wherein the binder material of (d) is selected from the group consisting of magnesium hydroxide, carboxy-methyl cellulose, guar gum and carbopol and mixtures thereof.

4. A battery according to claim 3 wherein the binder material of (d) is magnesium hydroxide.

5. A battery according to claim 1 wherein the dispersing medium of (d) is selected from the group consisting of water and alkaline electrolytes.

6. A battery according to claim 5 wherein the dispersing medium of (d) is selected from the group consisting of sodium hydroxide and potassium hydroxide.

7. A battery according to claim 1 wherein the dispersing medium of (d) is the same as the alkaline electrolyte of (c).

8. A battery according to claim 1 wherein the inorganic material of (d) is titanium dioxide.

9. A Battery according to claim 1 wherein the surface density of the inorganic material is from about 0.10 to about 1.00 × 10$^{-3}$ g/cm$^2$.

10. A battery according to claim 1 wherein the weight ratio of binder material to inorganic material in the mixture is from about 7:1 to about 40:1.

11. A battery according to claim 9 wherein the weight ratio of binder material to inorganic material in the mixture is from about 7:1 to about 40:1.

12. A battery according to claim 10 wherein the weight ratio of binder material to inorganic material is from about 15:1 to about 25:1.

13. A battery according to claim 11 wherein the weight ratio of binder material to inorganic material in the mixture is from about 15:1 to about 25:1.

14. A battery according to claim 1 wherein the organic barrier (d) comprises a two-layer organic substrate said substrate having sandwiched between said layers and adhered thereto a mixture consisting essentially of a binder material and an inorganic material in a dispersing medium.

15. A battery according to claim 1 wherein the organic barrier (d) comprises a single layer organic substrate havind adhered to one side thereof a mixture consisting essentially of a binder material and an inorganic material in a dispersing medium.

16. A battery according to claim 15 wherein the mixture is adhered to the positive electrode side of the organic substrate.

* * * * *